United States Patent
Vasudevan et al.

(10) Patent No.: US 7,928,351 B1
(45) Date of Patent: Apr. 19, 2011

(54) NEAR FIELD DIVERSITY METHOD FOR ESTIMATION AND CORRECTION OF ABERRATIONS

(75) Inventors: Gopal Vasudevan, San Jose, CA (US); Robert Duncan Reardon, Mountain View, CA (US); Eric Hartel Smith, San Jose, CA (US); Kenneth John Triebes, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 2109 days.

(21) Appl. No.: 10/842,987

(22) Filed: May 10, 2004

(51) Int. Cl.
 *G01J 1/42* (2006.01)
(52) U.S. Cl. ............ 250/201.9; 356/121; 356/512; 356/521; 359/846; 359/849
(58) Field of Classification Search ........ 250/201.9; 356/121, 512, 521; 359/846, 849
See application file for complete search history.

(56) References Cited

U.S. PATENT DOCUMENTS

| | | | | |
|---|---|---|---|---|
| 5,969,882 | A * | 10/1999 | Takahashi | 359/728 |
| 5,994,709 | A * | 11/1999 | Suzuki | 250/492.23 |
| 6,008,904 | A * | 12/1999 | Ishii et al. | 356/512 |
| 6,124,596 | A * | 9/2000 | Nakasuji et al. | 250/396 ML |
| 7,113,268 | B2 * | 9/2006 | Gerwe et al. | 356/121 |

OTHER PUBLICATIONS

Michael Reed Teague, "Deterministic Phase Retrieval: A Green's Function Solution", J. Opt. Soc. Am., vol. 73, No. 11, Nov. 1983, pp. 1434-1441.
Francois Roddier, "Wavefront Sensing and the Irradiance Transport Equation", Applied Optics, vol. 29, No. 10, Apr. 1, 1990, pp. 1402-1403.
Juan A. Quiroga, et al., "Wavefront Measurement by Solving the Irradiance Transport Equation for Multifocal Systems", Opt. Eng., vol. 40, No. 12, Dec. 2001, pp. 2885-2891.
T.E. Gureyev, et al., "Rapid Quantitative Phase Imaging Using the Transport of Intensity Equation", Opt. Comm., vol. 133, Jan. 1, 1997, pp. 339-346.
Francois Roddier, "Curvature Sensing and Compensation: A new Concept in Adaptive Optics", Applied Optics, vol. 27, No. 7, pp. 1223-1225, Apr. 1, 1988.

* cited by examiner

*Primary Examiner* — Seung C Sohn
(74) *Attorney, Agent, or Firm* — McDermott Will & Emery LLP

(57) ABSTRACT

System and method for estimating and correcting an aberration of an optical system. The method includes capturing a first plurality of images on a first plurality of planes. The first plurality of images is formed by at least the optical system. Additionally, the method includes processing at least information associated with the first plurality of images, and determining a first auxiliary function based upon at least the information associated with the first plurality of images. The first auxiliary function represents a first aberration of the optical system. Moreover, the method includes adjusting the optical system based upon at least information associated with the first auxiliary function.

33 Claims, 11 Drawing Sheets

Fig. 10C Michelson after 4 correction steps

Fig. 10B Michelson after first correction

Fig. 10A Michelson before aberration reduction

NEAR FIELD DIVERSITY METHOD FOR ESTIMATION AND CORRECTION OF ABERRATIONS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates generally to optics. More particularly, the invention provides techniques for correcting optical aberrations. Merely by way of example, the invention has been applied to optical mirrors, but it would be recognized that the invention has a much broader range of applicability.

Optical system has been widely used for detecting images of various targets. The optical system usually introduces discrepancies to the images. The discrepancies including phase errors result from various sources, such as aberrations associated with individual segments of optical system including optical mirrors and discrepancies between input and output of optical system. These errors often need to be estimated and corrected in order to improve image quality. For example, a space telescope such as the James Webb Space Telescope may have large phase errors after its deployment, and these aberrations often need to be corrected with the telescope remaining in space.

In order to correct the optical aberrations, a Green's function approach has been proposed. This method derives the transport of intensity equation and solves for the auxiliary function. In other words, the Green's function approach uses known phase or phase gradient at the boundary of optical aperture of the optical system and determines the phase map of the entire optical aperture. Applied to an astronomical telescope, this method measures irradiance on either side of telescope focus and radial gradient of wavefront at the edge of telescope aperture. Irradiance measurements do not need to be performed on planes symmetrically located on either side of telescope focus. Consequently, a Poisson equation is solved to obtain the wavefront error in the interior of the telescope aperture.

When the wavefront error of an aperture is large, the Green's function approach usually cannot effectively sample the entire optical aperture. Instead, the optical aperture is usually divided into several sub-apertures, and phases within each sub-aperture are measured. Phase errors in each sub-aperture are then determined and corrected. Afterwards, sizes of sub-apertures are increased, and phase errors within enlarged sub-apertures are further corrected. Through iterations, phase errors within the aperture become so small that the entire aperture may be sampled. This iterative sub-aperture approach requires additional masks and setups, and may even require several iterative corrections at each sub-aperture size. Hence this method is costly and time consuming.

In addition, the above method sometimes uses curvature-based wavefront sensing. This sensing technique requires information about radial derivative of phase at the boundary of optical aperture. For large mirrors with several segments, a large number of boundary radial derivatives need to be determined. Hence this method may be cumbersome.

FIG. 1 is a simplified diagram illustrating technique for phase error correction. The correction method includes at least five processes: secondary mirror alignment process 110, coarse tilt adjustment process 120, coarse petal figuring process 130, inter-petal phasing process 140, tilt/figure refinement process 150, and full aperture figuring process 160. Inter-petal phasing process 140 and tilt/figure refinement process 150 may be performed iteratively. As shown in FIG. 1, processes 110, 120, 130, and 140 use different pupil plane masks 112, 122, 132, 142, and 152 respectively. In addition, processes 110, 130, 150, and 160 use additional hardware. For example, process 110 uses Phase Diverse Phase Retrieval ("PDPR") plates 114, process 130 uses fine steering mirror 134, process 150 uses PDPR plates 154 and fine steering mirror 155, and process 160 uses PDPR plates 164. At secondary mirror alignment process 110, point source functions ("PSFs") in focal plane and defocus planes are measured, and sharpness maximization and PDPR analysis are performed. At coarse tilt adjustment process 120, PSFs for each petal is measured, and centroid analysis is performed. At coarse petal figuring process 130, PSFs for each sub-aperture is measured, and analysis based on PSF maximization algorithm is performed. At inter-petal phasing process 140, grism fringes are measured, and fringe analysis is performed. At tilt/figure refinement process 150, PSFs for each petal in focal plane and defocus planes are measured, and centroid analysis and PDPR analysis are performed. At full aperture figuring process 160, PSFs for entire aperture in focal plane and defocus planes are measured, and PDPR analysis is performed.

Hence it is desirable to simplify and improve phase correction technique.

BRIEF SUMMARY OF THE INVENTION

The present invention relates generally to optics. More particularly, the invention provides techniques for correcting optical aberrations. Merely by way of example, the invention has been applied to optical mirrors, but it would be recognized that the invention has a much broader range of applicability.

According to one embodiment of the present invention, a method for estimating and correcting an aberration of an optical system includes capturing a first plurality of images on a first plurality of planes. The first plurality of images is formed by at least the optical system. Additionally, the method includes processing at least information associated with the first plurality of images, and determining a first auxiliary function based upon at least the information associated with the first plurality of images. The first auxiliary function represents a first aberration of the optical system. Moreover, the method includes adjusting the optical system based upon at least information associated with the first auxiliary function.

According to another embodiment of the present invention, a method for estimating and correcting an aberration of an optical system includes capturing a first plurality of images on a first plurality of planes. The first plurality of images is formed by at least the optical system. Additionally, the method includes processing at least information associated with the first plurality of images, and determining a first auxiliary function based upon at least the information associated with the first plurality of images. The first auxiliary function represents a first aberration of the optical system. Moreover, the method includes adjusting the optical system based upon at least information associated with the first auxiliary function. The capturing, the processing, the determining, and the adjusting are free from dividing an aperture of the optical system into a plurality of sub-apertures, estimating an aberration for each sub-aperture, or reducing the aberration for each sub-aperture.

According to yet another embodiment of the present invention, a method for estimating and correcting an aberration of an optical system includes capturing a plurality of images on a plurality of planes. The plurality of images is formed by at least the optical system. Additionally, the method includes measuring a plurality of intensities for each of the plurality of images. The plurality of intensities corresponds to a plurality of locations on each of the plurality of planes respectively. Moreover, the method includes obtaining a plurality of derivatives of intensity with respect to an optical axis of the optical system using at least information associated with the plurality of intensities. The plurality of derivatives corresponds to the plurality of locations on a focal plane of the optical system. Also, the method includes determining a first auxiliary function based upon at least information associated with the plurality of derivatives. The first auxiliary function represents an aberration of the optical system.

According to yet another embodiment of the present invention, a system for estimating and correcting an aberration of an optical system includes a testing system, a control system connected to the testing system, and an adjustment system connected to the testing system and to the control system. The testing system and the control system are configured to capture a plurality of images on a plurality of planes. The plurality of images is formed by at least the optical system. The control system is configured to process at least information associated with the plurality of images and determine an auxiliary function based upon at least the information associated with the plurality of images. The first auxiliary function represents a first aberration of the optical system. The adjustment system and the control system are configured to adjust the optical system based upon at least information associated with the auxiliary function.

The techniques of the present invention have numerous advantages. Certain embodiments of the present invention can sense and correct aberrations on the entire aperture of an optical system without dividing the aperture into sub-apertures. The amount of time required for aberration reduction may be shortened. Some embodiments of the present invention work for segmented apertures. Certain embodiments of the present invention can improve aberration reduction by iterations. The iterative process alleviates convergence problem encountered by conventional techniques. Some embodiments of the present invention can simplify hardware requirements for aberration reduction, such as hardware requirements for coarse alignments of large telescopes. Certain embodiments of the present invention do not use the Pseudo-Hartmann mask, which is often used by conventional techniques for coarse figuring. Conventional techniques for coarse figuring often require Pseudo-Hartmann masks, each of which is made up of sets of several multi-faceted prisms. Fabrication of the masks is difficult, time consuming and costly. Therefore, certain embodiments of the present invention can lower the cost and shorten the time for aberration reduction. Some embodiments of the present invention usually can be implemented with minimum computation time.

Depending upon the embodiment under consideration, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates generally to optics. More particularly, the invention provides techniques for correcting optical aberrations. Merely by way of example, the invention has been applied to optical mirrors, but it would be recognized that the invention has a much broader range of applicability.

Figure 1:
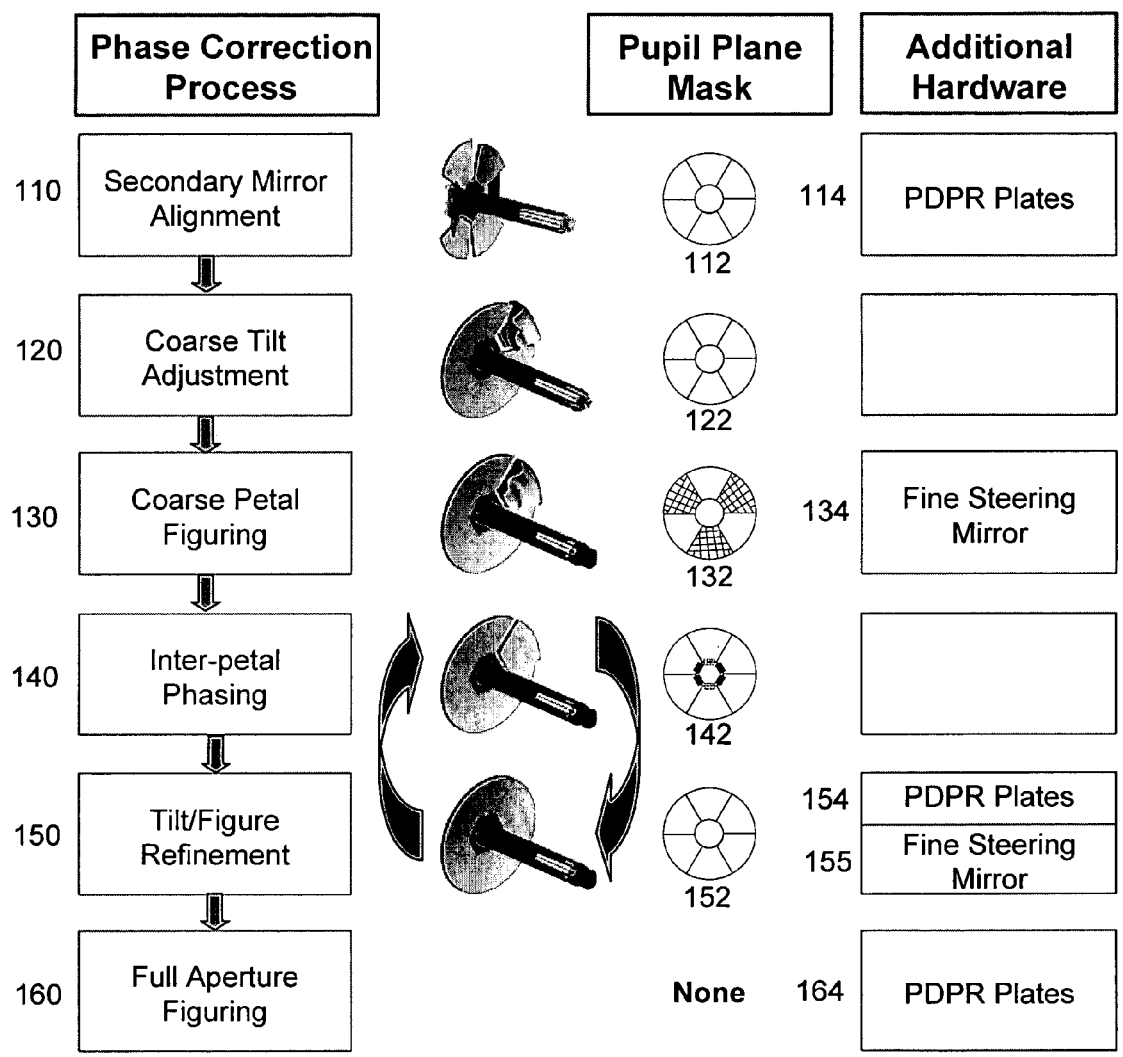
FIG. 1 is a simplified diagram illustrating technique for phase error correction.
Figure 2:
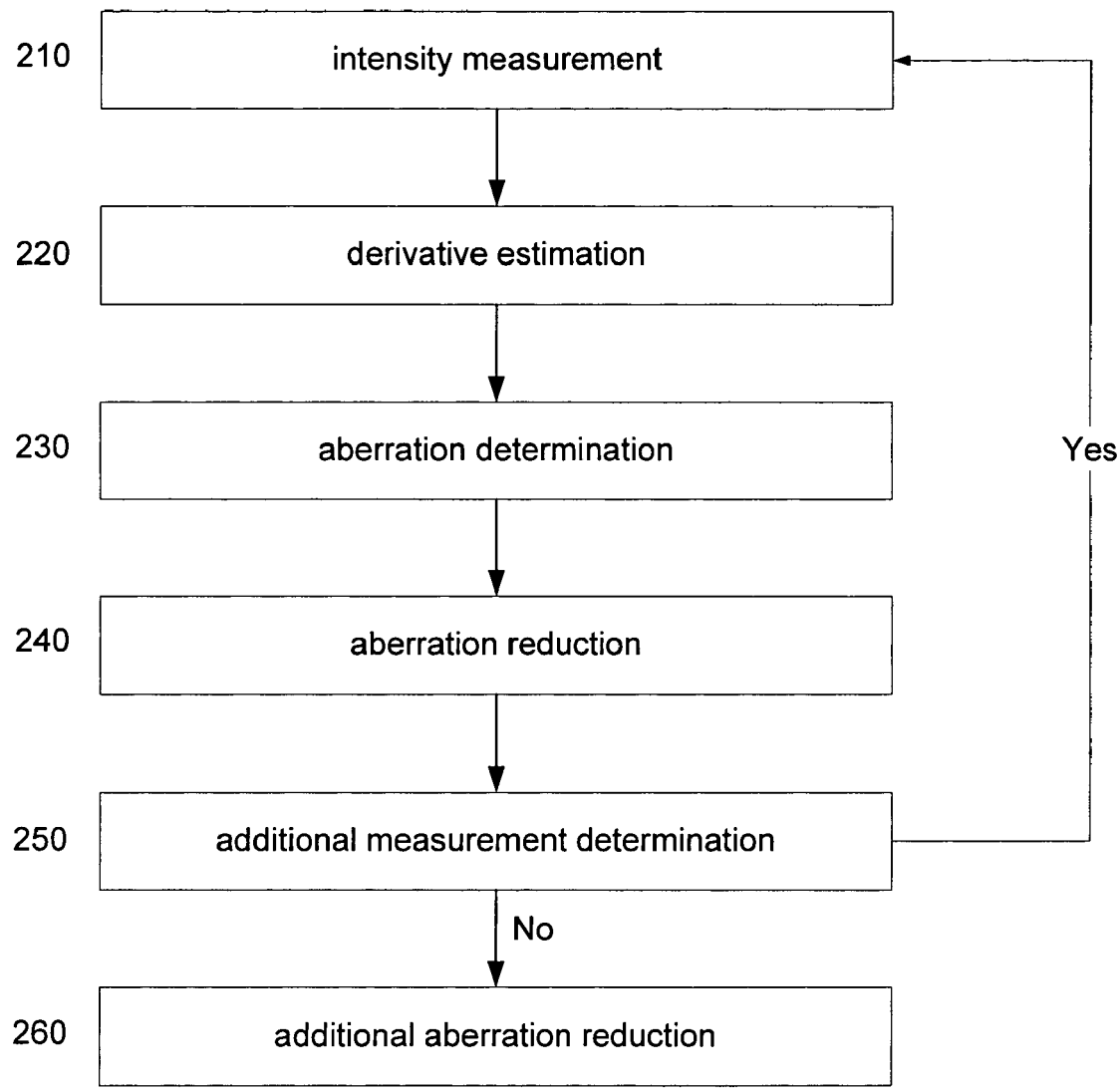
FIG. 2 is a simplified block diagram for correcting optical aberrations according to one embodiment of the present invention.

FIG. 2 is a simplified block diagram for correcting optical aberrations according to one embodiment of the present invention. This diagram is merely an example, which should not unduly limit the scope of the claims. One of ordinary skill in the art would recognize many variations, alternatives, and modifications. The method of correcting optical aberrations includes process 210 for intensity measurement, process 220 for derivative estimation, process 230 for aberration determination, process 240 for aberration reduction, and process 250 for additional measurement determination. Although the above has been shown using a selected sequence of processes, there can be many alternatives, modifications, and variations. For example, some of the processes may be expanded and/or combined. For example, process 220 of derivative estimation and process 230 of aberration determination may be combined. Other processes may be inserted to those noted above. For example, conventional phase diversity process for aberration reduction may be used in combination with processes 210, 220, 230, 240, and 250. Depending upon the embodiment, the specific sequences of steps may be interchanged with others replaced. Process 240 for aberration reduction is optional and may be skipped under certain conditions. Further details of these processes are found throughout the present specification and more particularly below.

At process 210 of intensity measurement, optical images are formed on various planes and image intensities are measured. The planes may be located on either side of focal plane or optionally coincide with the focal plane. If aberrations of the optical system do not change image intensities on a certain plane, image intensities on this plane do not need to be measured. The skipped plane may be the focal plane or a defocus plane of the optical system. The optical system may be a telescope, a mirror, or any system with an optical aperture. Measured image intensities describe intensity as a function of location on respective planes.

Figure 3:
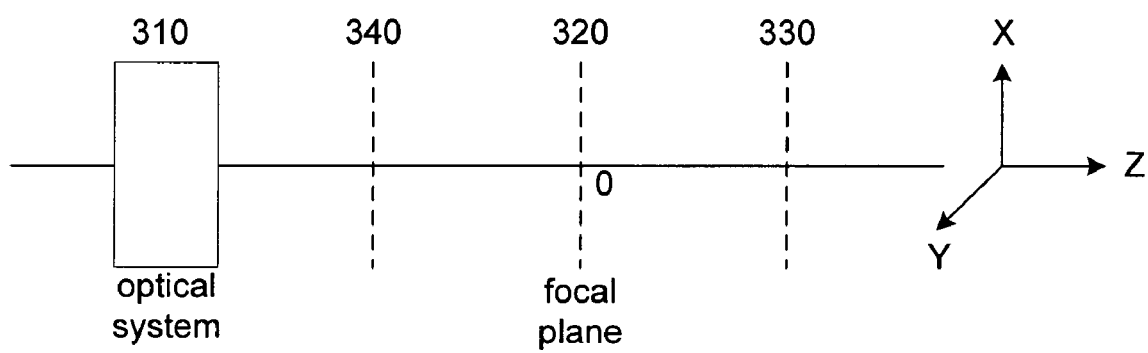
FIG. 3 illustrates a simplified geometry for process of intensity measurement according to one embodiment of the present invention.

FIG. 3 illustrates a simplified geometry for process 210 of intensity measurement according to one embodiment of the present invention. One of ordinary skill in the art would recognize many variations, alternatives, and modifications. As shown in FIG. 3, optical system 310 with optical aberrations has an optical axis z. Focal plane 320 of optical system 310 is located at z equal to zero. Positions of defocus planes are measured by z values. Z value is larger than zero for defocus planes, such as plane 330, located on the right side of focal plane 320, as shown in FIG. 3. Similarly, z value is smaller than zero for defocus planes, such as plane 340, located to the left side of focal plane 320, as shown in FIG. 3. Locations on each plane are measured by x and y values. Hence measured intensities depend on x, y, and z. More specifically, measured intensities may include $I_{measure}(x,y,z_1)$, $I_{measure}(x,y,z_2)$, ..., $I_{measure}(x,y,z_n)$, ..., $I_{measure}(x,y,z_N)$, where N is a positive integer representing the number of different planes on which image intensities are measured. For example, N may be equal to 2, 3, 100, or any other positive integer.

At process 220 of derivative estimation, the derivative of measured intensities taken along the z axis at z equal to zero is estimated as shown below.

$$D(x, y) = \left. \frac{\partial I(x, y, z)}{\partial z} \right|_{z=0} \quad \text{(Equation 1)}$$

where $I(x,y,z)$ is image intensity as a function of x, y, and z. $D(x,y)$ is the derivative of intensity taken along the z axis at z equal to zero. z equal to zero corresponds to location of the focal plane, so $D(x,y)$ is effectively the derivative of $I(x,y,z)$ along the z direction on the focal plane.

$D(x,y)$ may be estimated with various methods. For example, $D(x,y)$ may be obtained if $I(x,y,z)$ is obtained within at least the vicinity of the focal plane, i.e., $-a<z<b$, where a and b is larger than or equal to zero. Preferably a and b are both larger than zero. $I(x,y,z)$ may be estimated by fitting measured intensities on various planes to a function. The measured intensities includes $I_{measure}(x,y,z_1)$, $I_{measure}(x,y,z_2)$, ..., $I_{measure}(x,y,z_n)$, $I_{measure}(x,y,z_N)$. The function that can describe $I(x,y,z)$ in the vicinity of the focal plane may include at least $$\sum_{m=0}^{M} a_m(x, y) z^m,$$

where M is an arbitrary positive integer. $a_m(x,y)$ varies with x and y but is independent of z. For example, when $M=1$, $I(x,y,z)=a_0(x,y)+a_1(x,y) \times z$     (Equation 2)

when $M=2$, $I(x,y,z)=a_0(x,y)+a_1(x,y) \times z+a_2(x,y) \times z^2$     (Equation 3)

when $M=3$, $I(x,y,z)=a_0(x,y)+a_1(x,y) \times z+a_2(x,y) \times z^2+a_3(x,y) \times z^3$     (Equation 4)

Magnitude of M determines the minimum number of different planes on which image intensities need to be measured at process 210 of intensity measurement. N usually needs to be larger than M. Regardless of magnitude of M, $a_m(x,y)$ is usually estimated with measured intensities such as $I_{measure}(x,y,z)$, $I_{measure}(x,y,z_2)$, ..., $I_{measure}(x,y,z_n)$, ..., $I_{measure}(x,y,z_N)$.

Coefficients of a fitting function $I(x,y,z)$ may be estimated by the least square fit method. $I(x,y,z)$ may be $$\sum_{m=0}^{M} a_m(x, y) z^m$$

or any other function. For example, $$\sum_{m=0}^{M} a_m(x, y) z^m$$

has coefficients $a_m(x,y)$, where $0 \leq m \leq M$. The least square fit method assesses closeness of the fitting function $I(x,y,z)$ to measured intensities as follows.

$$\chi^2 = \iint_{ImagingArea} \left[ \sum_{i=1}^{N} \left( \frac{I_{measure}(x, y, z_i) - I(x, y, z)}{I_{measure}(x, y, z_i)} \right)^2 \right] dx dy \quad \text{(Equation 5)}$$

where ImagingArea covers the area on a plane where any respective one of $I_{measure}(x,y,z_1)$, $I_{measure}(x,y,z_2)$, ..., $I_{measure}(x,y,z_n)$, ..., $I_{measure}(x,y,z_N)$ is captured. By minimizing $\chi^2$, the least square fit method finds values of coefficients, such as $a_m(x,y)$ for $$\sum_{m=0}^{M} a_m(x, y) z^m.$$

In addition, the least square fit method may also be used to compare capabilities of various fitting functions to describe measured intensities. For each fitting function, its coefficients may be determined by minimizing $\chi^2$. The resulting $\chi^2$ minimums for different fitting functions may be different. The fitting function with the smallest $\chi^2$ minimum usually provides the best fit to the measured intensities, and may be chosen to calculate $D(x,y)$ according to Equation 1.

At process 230 of aberration determination, the aberration of the optical system is obtained. The aberration is described by a function called $\Psi(x,y,z)$ at z equal to zero. $\Psi(x,y,z)$ is called auxiliary function. $\Psi(x,y,0)$ can be calculated as follows:

$$\frac{2\pi}{\lambda} D(x, y) = -\nabla^2 \Psi(x, y, 0) \quad \text{where} \quad \text{(Equation 6)}$$

$$\nabla^2 = \frac{\partial^2}{\partial x^2} + \frac{\partial^2}{\partial y^2} \quad \text{(Equation 7)}$$

At process 240 of aberration reduction, the optical system is adjusted in order to reduce aberrations. The adjustment may be performed with various methods. For example, surface of an optical mirror may be polished. Also, surface of an optical mirror may be adjusted with actuators. Actuators may be placed on the backside of the mirror. In order to use actuators to reduce aberrations on optical mirror, the relationship between settings of actuators and aberrations, also called influence function, needs to be determined. The influence function may be obtained by measuring influence function data and fitting the measured data to an influence function. The fitting process may use the least square fit method or any other fitting method. The influence function may take the form of various functions. In addition, measurements of influence function data and fitting of the influence function may be performed before process 240, during process 240, or combination thereof. Further, process 240 may be skipped if process 230 of aberration determination shows that aberrations are sufficiently small.

At process 250 of additional measurement determination, the need for any additional intensity measurement is determined. For example, if process 230 has determined that aberrations are small or if process 240 has been skipped, no additional measurement may be needed. Other factors may also affect the need for additional intensity measurement, such as time, cost, and performance requirement. If process 250 determines an additional measurement is needed, processes 210, 220, 230, and 240 may be performed. As discussed above, process 240 may be skipped.

In order to effectively reduce aberrations through iterations of processes 210, 220, 230, and 240, process 210 of intensity measurement may be performed on different sets of planes at different iterations. For example, $I_{measure}(x,y,z_1)$, $I_{measure}(x,y,z_2)$, ..., $I_{measure}(x,y,z_n)$, ..., $I_{measure}(x,y,z_N)$ may be measured on planes having greater distances from the focal plane than respective planes from the focal plane at the previous performance of process 210. Therefore $z_1, z_2, \ldots, z_n, \ldots, z_N$ at a subsequent iteration may be larger than $z_1, z_2, \ldots, z_n, \ldots, z_N$ for previous performance of process 210 respectively. Alternatively, the subsequent iteration may use $z_1, z_2, \ldots, z_n, \ldots, z_N$ all which are the same as those used for previous measurement respectively. Subsequent iteration may use $z_1, z_2, \ldots, z_n, \ldots, z_N$ some of which are the same as and rest of which are different from those used for previous measurement respectively. Subsequent iteration may measure intensities on the same number of planes as previous performance of process 210. Subsequent iteration may measure intensities on different number of planes than previous performance of process 210.

Figure 4:
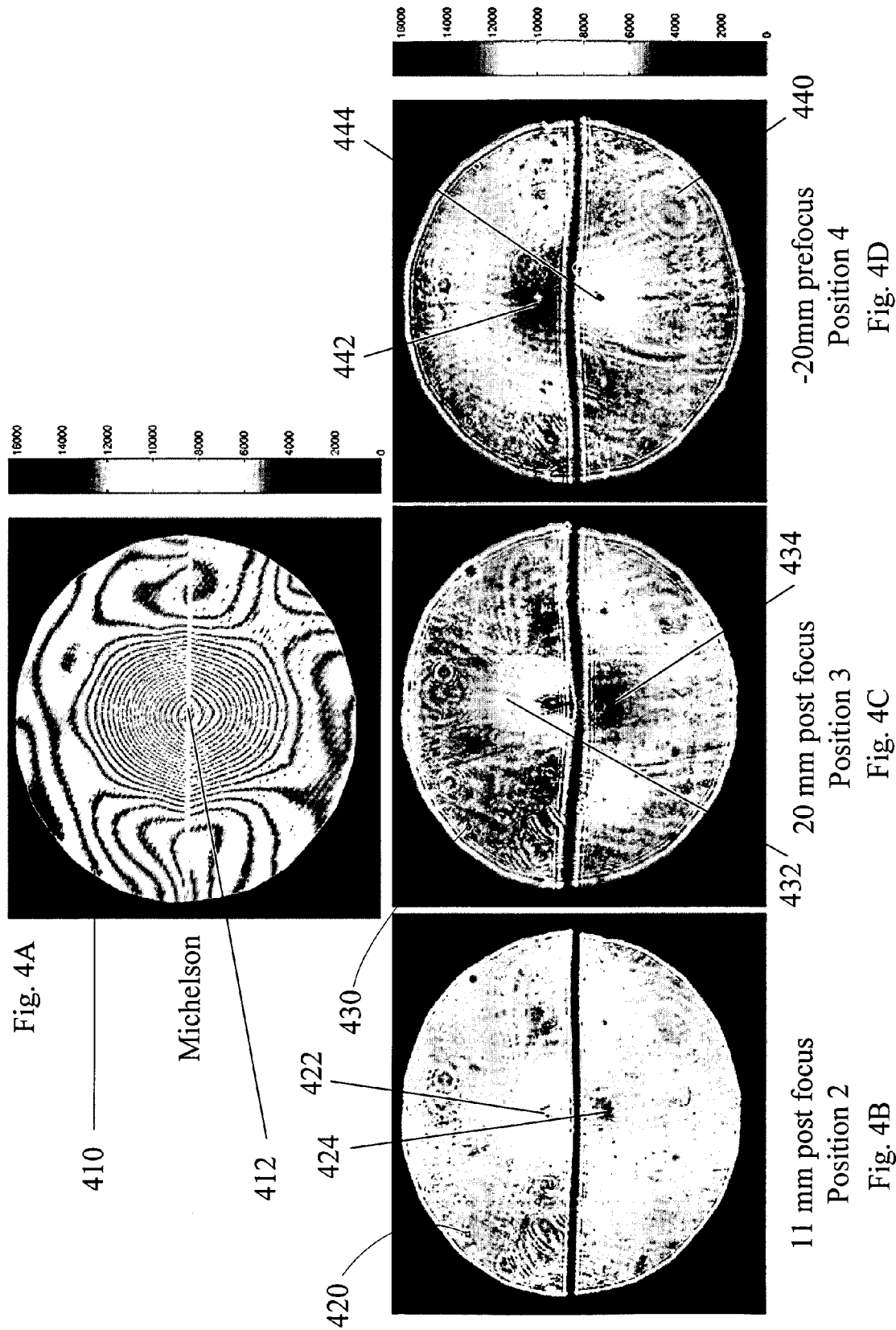
FIGS. 4A through 4D illustrate measured image intensities on different planes with aberrations on mirror surface.

FIGS. 4A through 4D illustrate measured image intensities on different planes with aberrations on mirror surface. The measurements are merely examples, which should not unduly limit the scope of the present invention. One of ordinary skill in the art would recognize many variations, alternatives, and modifications. As shown in FIG. 4(A), direct measurements by Michelson interferometer shows that mirror surface 410 has a valley and a bump in or around center region 412. These aberrations create bright area 422 and dark area 424 on image 420 that is captured on a plane located farther away from mirror surface 410 than the focal plane from mirror surface 410 by 11 mm, as shown in FIG. 4B. Hence the image plane has a z value of 11 mm as defined in FIG. 3. In FIG. 4C, image 430 is captured on a plane having a z value of 20 mm. Bright area 432 and dark area 434 indicates the existence of aberrations on mirror surface 410. Similarly, image 440 is captured on a plane having a z value of −20 mm. Dark area 442 and bright area 444 indicate the existence of aberrations on mirror surface 410. By comparison, images 430 and 440 are captured on planes symmetrically located on opposite sides of the focal plane. Bright area 432 is located in roughly the same location as dark area 442; dark area 434 is located in roughly the same location as bright area 444. In addition, both images 430 and 440 are captured on planes further away from the focal plane than image 420 from the focal plane. Consequently, areas 432, 434, 442, and 444 have generally bigger sizes and stronger contrasts than areas 422 and 424. Hence images captured on planes further away from the focal plane usually reflects aberrations on mirror surface more sensitively than images captured on planes closer to the focal plane.

Figure 5:
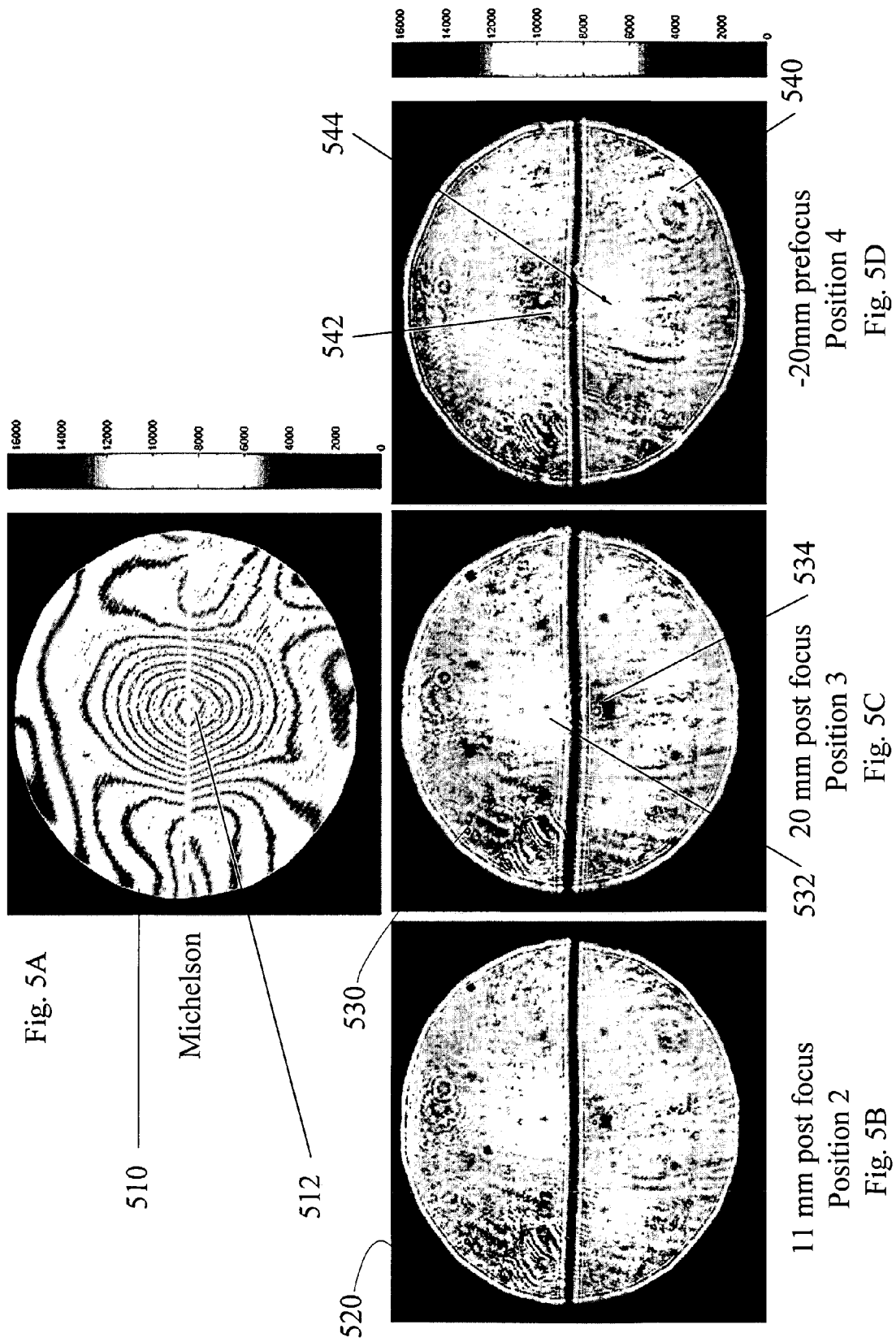
FIGS. 5A through 5D illustrate measured image intensities on different planes with other aberrations on mirror surface.

FIGS. 5A through 5D illustrate measured image intensities on different planes with other aberrations on mirror surface. The measurements are merely examples, which should not unduly limit the scope of the present invention. One of ordinary skill in the art would recognize many variations, alternatives, and modifications. As shown in FIG. 5A, measured Michelson fringes show that mirror surface 510 has a bump and a valley in or around center area 512. But the bump and valley in FIG. 5A are not as severe as those in FIG. 4A. Consequently, the low bump or the shallow valley does not create strong intensity variations on the plane at z equal to 11 mm, as shown in image 520 of FIG. 5B. In contrast, image 530 captured at z equal to 20 mm has bright area 532 and dark area 534, as shown in FIG. 5C. Similarly, FIG. 5D shows dark area 542 and bright area 544 on image 540 captured at z equal −20 mm.

Figure 6:
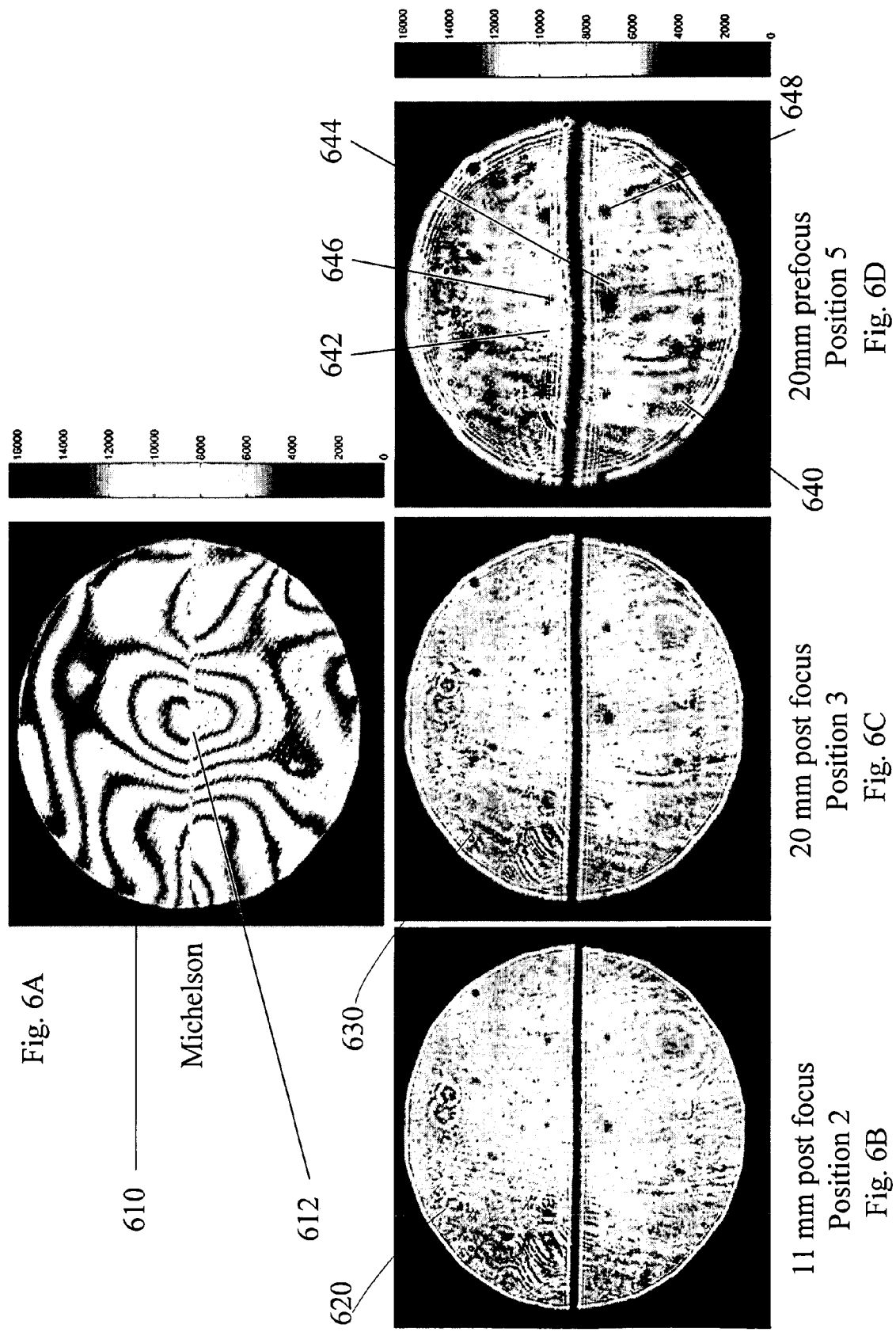
FIGS. 6A through 6D illustrate measured image intensities on different planes with yet other aberrations on mirror surface.

FIGS. 6A through 6D illustrate measured image intensities on different planes with yet other aberrations on mirror surface. The measurements are merely examples, which should not unduly limit the scope of the present invention. One of ordinary skill in the art would recognize many variations, alternatives, and modifications. As shown in FIG. 6A, measured Michelson fringes show that mirror surface 610 has a bump and a valley in or around center area 612. But the bump and valley in FIG. 6A are not as severe as those in FIGS. 4A and 5A. As shown in FIGS. 5B, 5C, and 5D, images 620, 630, and 640 are captured at z equal to 11 mm, 20 mm, and 40 mm respectively. For image 640, there appear bright area 642 and dark area 644 reflecting aberrations on mirror surface 610. Also, image 640 shows locations of actuators attached to the back of mirror surface 610, such as locations 646 and 648.

Figure 7:
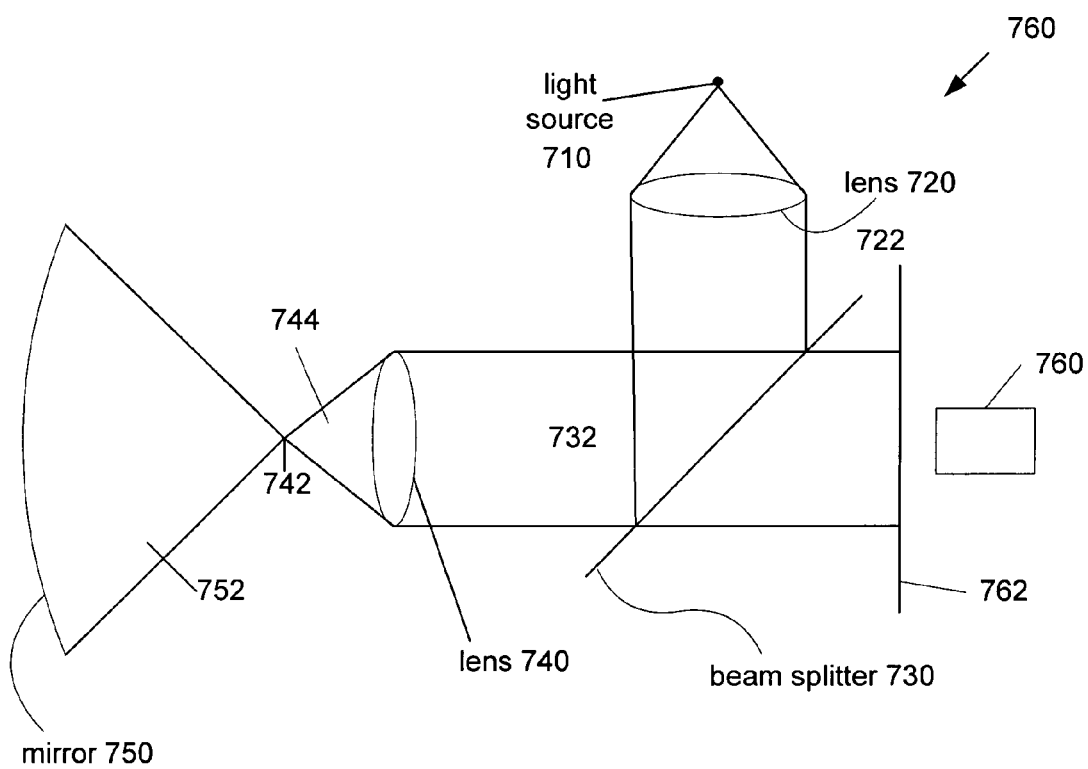
FIG. 7 is a simplified system for estimation and correction of aberrations according to one embodiment of the present invention.

FIG. 7 is a simplified system for estimation and correction of aberrations according to one embodiment of the present invention. The system is merely an example, which should not unduly limit the scope of the present invention. One of ordinary skill in the art would recognize many variations, alternatives, and modifications. System 700 includes light source 710, lens 720, beam splitter 730, lens 740, mirror 750, and image detector 760. Although the above has been shown using systems 710 through 760, there can be many alternatives, modifications, and variations. For example, some of the systems may be expanded and/or combined. Lens 720 may be expanded to several lenses. Also, lens 740 may be expanded to several lenses. Other systems may be inserted to those noted above. Depending upon the embodiment, the specific systems may be replaced. For example, mirror 750 may be replaced by a telescope or other system with optical aperture. Further details of these systems are found throughout the present specification and more particularly below.

As shown in FIG. 7, light source 710 is a point light source such as a laser source combined with a pin-hole or a fiber-optic, and is placed at the focal point of lens 720. Light source 710 generates radiation with substantially spherical wavefront. The radiation is converted into collimated beam 722 by lens 720. Collimated beam 722 travels to beam splitter 730 and is partially reflected to form collimated beam 732. Beam 732 travels to lens 740 and is converted into beam 744. Lens 740 focuses beam 744 to focal point 742, which is also the center of curvature for mirror 750. Beam 744 travels to focal point 742 and then spreads out to reach mirror 750. Mirror 750 reflects beam 744 to form beam 752 and focuses beam 752 at focal point 742. Passing through focal point 742, beam 752 is then collimated by lens 740 and reaches beam splitter 730. Beam 752 partially passes through beam splitter 730 and then forms images on planes located either at focal plane 762 of mirror 750 or on either side of focal plane 762. The images, including their intensities, are captured by image detector 760. Image detectors 760 may be any detecting device that can measure intensities of images. System 700 may be used to perform method for estimation and correction of aberrations of mirror 750 including process 210 for intensity measurement as shown in FIG. 2. For example, an aberration includes a hill and a valley on the aperture. The vertical distance between the top of the hill and the bottom of the valley is at least one wavelength of radiation from the light source 710.

Figure 8:
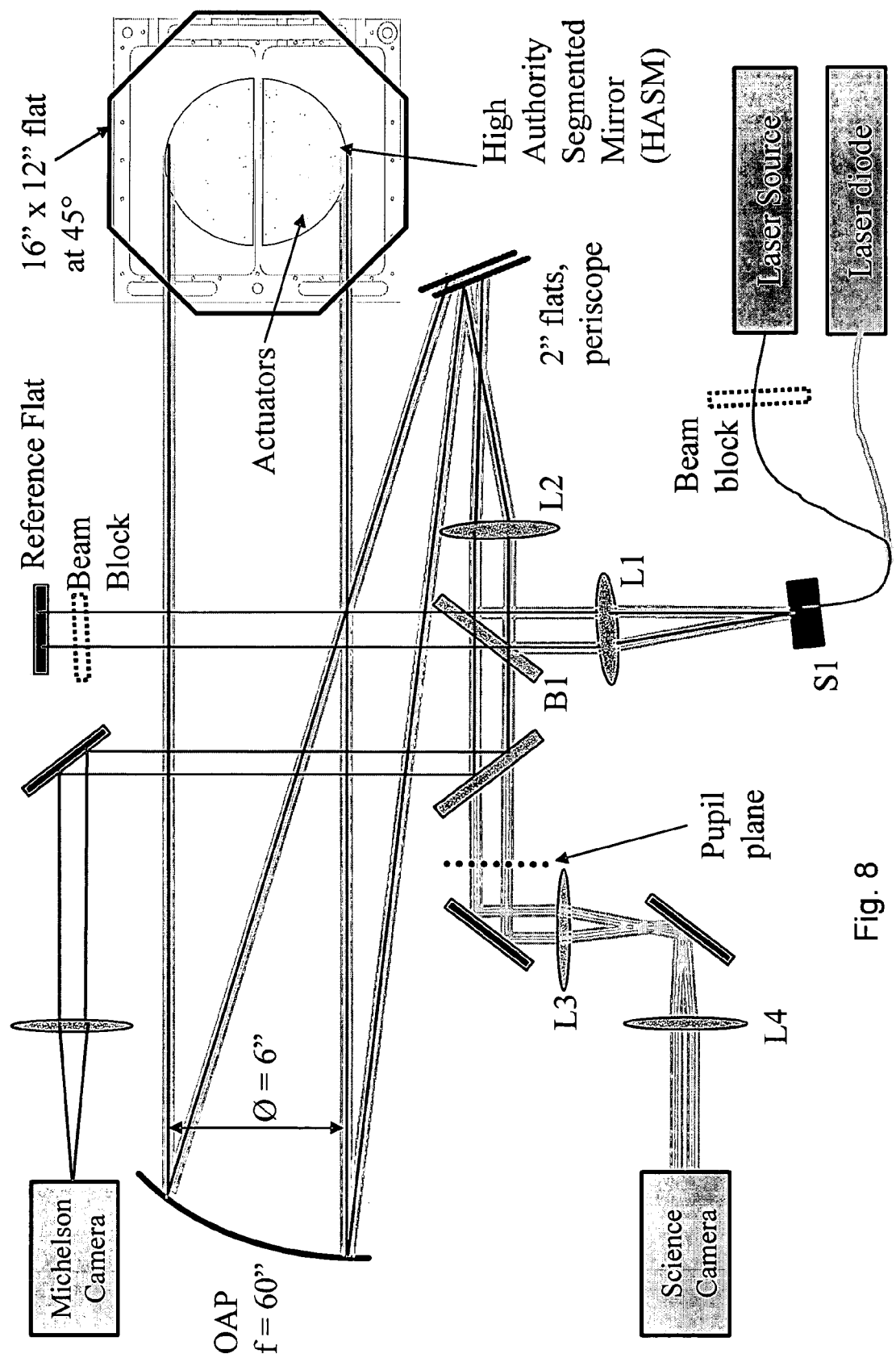
FIG. 8 is a simplified system for estimation and correction of aberrations according to another embodiment of the present invention.

FIG. 8 is a simplified system for estimation and correction of aberrations according to another embodiment of the present invention. The system is merely an example, which should not unduly limit the scope of the present invention. One of ordinary skill in the art would recognize many variations, alternatives, and modifications.

Figure 9:
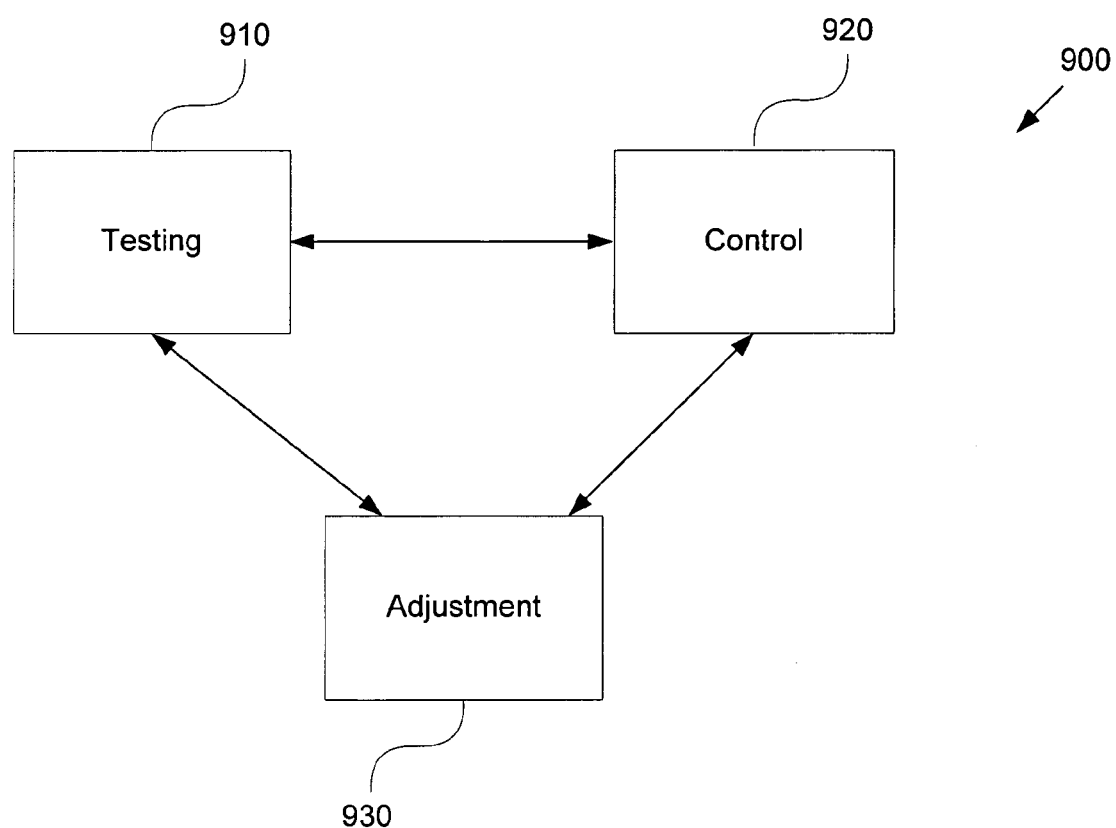
FIG. 9 is a simplified system for estimation and correction of large aberrations according to yet another embodiment of the present invention.

FIG. 9 is a simplified system for estimation and correction of large aberrations according to yet another embodiment of the present invention. The system is merely an example, which should not unduly limit the scope of the present invention. One of ordinary skill in the art would recognize many variations, alternatives, and modifications. System 900 includes testing system 910, control system 920, and adjustment system 930. Although the above has been shown using systems 910, 920, and 930, there can be many alternatives, modifications, and variations. For example, some of the systems may be expanded and/or combined. For example, testing system 910 and testing 930 may be combined. Other systems may be inserted to those noted above. For example, system for performing conventional phase diversity process may be added. Depending upon the embodiment, the specific systems may be replaced. Further details of these systems are found throughout the present specification and more particularly below.

Testing system 910 may have some or all components of system 700 as described in FIG. 7. Control system 920 may be a personal computer, a server, a customized processor, or any other system. Control system 920 may perform process 220 for derivative estimation, process 230 for aberration determination, and process 250 of additional measurement determination as described in FIG. 2. In addition, control system 920 and testing system 910 may perform process 210 of intensity measurement. Adjustment system 930 may include polishing system, actuators, or combination thereof. For example, actuators may be placed on the backside of mirror 750 if testing system 910 has at least some components of system 700. Optical adjustment system 930 and control system 920 may perform process 240 for aberration reduction.

In addition, control system 920 may include code that automatically directs testing system 910, control system 920, and adjustment system 930 to perform the inventive process 210 for intensity measurement, process 220 for derivative estimation, process 230 for aberration determination, process 240 for aberration reduction, and process 250 for additional measurement determination. The computer code may be implemented in Matlab, C++, or any other computer language.

FIGS. 10A through 10C show simplified experimental results according to yet another embodiment of the present invention. The experiment is merely an example, which should not unduly limit the scope of the present invention. One of ordinary skill in the art would recognize many variations, alternatives, and modifications. In the experiment, mirror surface is measured by Michelson interferometer before any aberration reduction process and after each aberration reduction process in order to examine effectiveness of method and system of the present invention. As shown in FIG. 10A, mirror surface has certain aberrations. After the first aberration reduction process is performed according to the present invention, the measured Michelson fringes show reduced aberrations on the mirror surface, as shown in FIG. 10B. After four iterations of aberration reduction processes, the aberrations on the mirror surface are almost eliminated, as shown in FIG. 10C.

Figure 10:
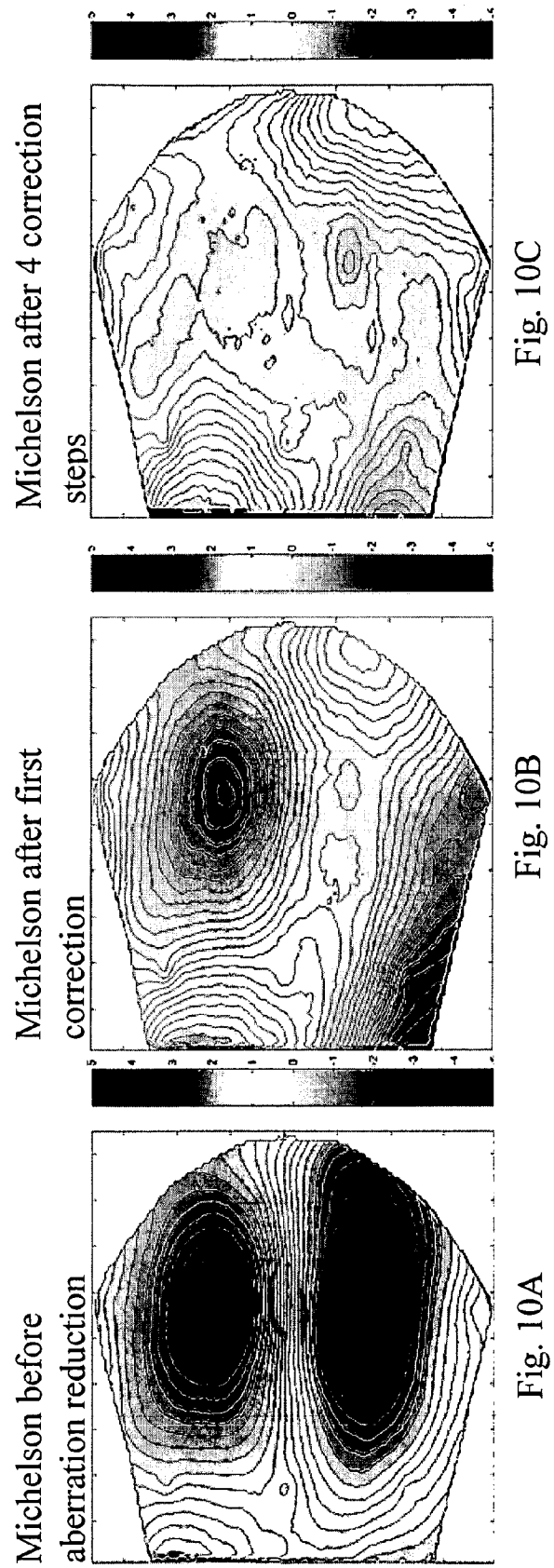
FIGS. 10A through 10C show simplified experimental results according to yet another embodiment of the present invention.
Figure 11:
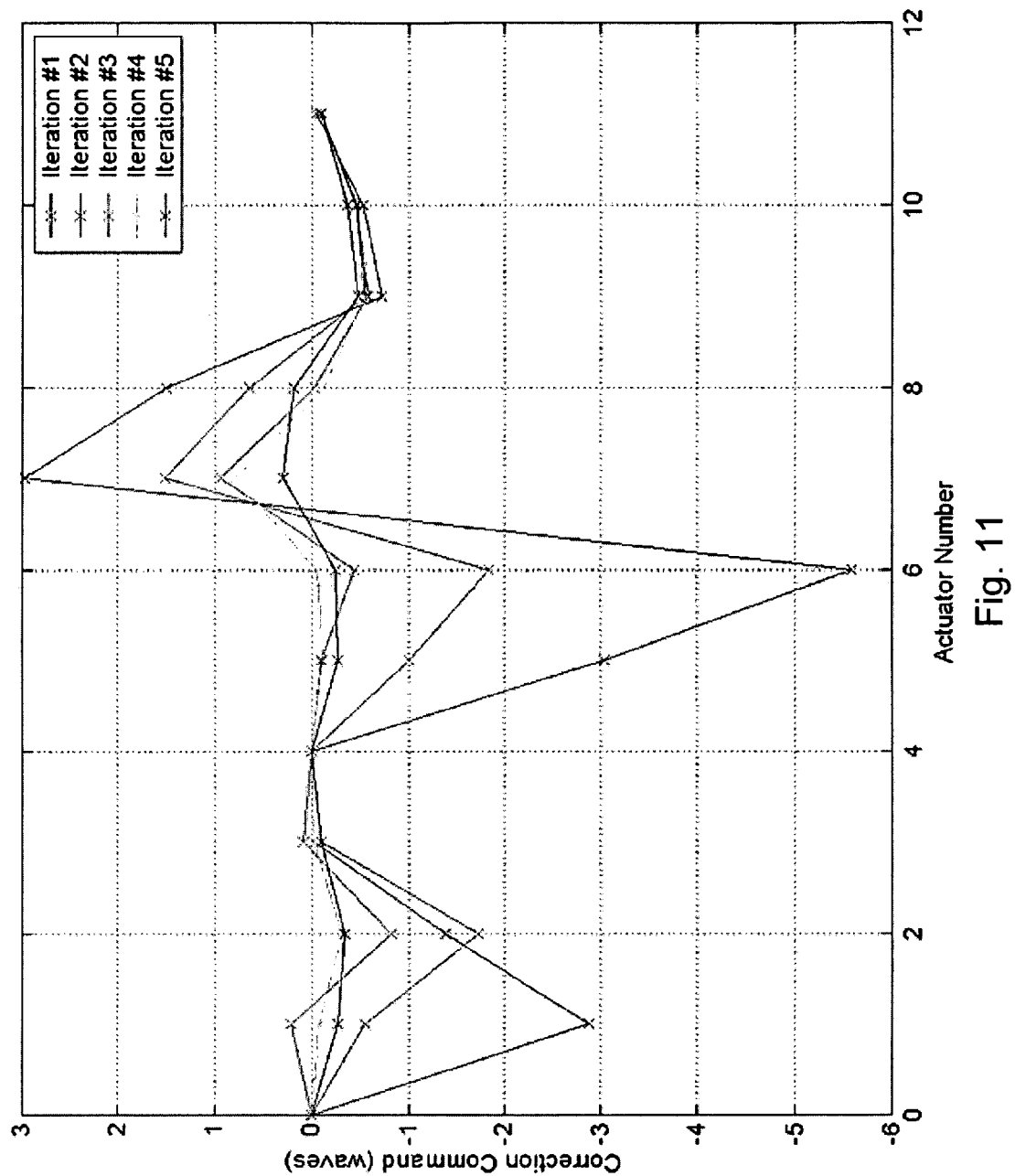
FIG. 11 shows actuator commands for each iteration of aberration reduction process.

FIG. 11 shows actuator commands for each iteration of aberration reduction process as described in FIGS. 10A through 10C. The actuator commands are merely examples, which should not unduly limit the scope of the present invention. One of ordinary skill in the art would recognize many variations, alternatives, and modifications. For each actuator, the magnitude of correction usually decreases with number of iteration. In the meantime, the magnitudes of optical aberrations also decrease with number of iteration, as shown in FIGS. 10 through 10C.

The techniques of the present invention have numerous advantages. Certain embodiments of the present invention can sense and correct aberrations on the entire aperture of an optical system without dividing the aperture into sub-apertures. The amount of time required for aberration reduction may be shortened. Some embodiments of the present invention work for segmented apertures. Certain embodiments of the present invention can improve aberration reduction by iterations. The iterative process alleviates convergence problem encountered by conventional techniques. Some embodiments of the present invention can simplify hardware requirements for aberration reduction, such as hardware requirements for coarse alignments of large telescopes. Certain embodiments of the present invention do not use the Pseudo-Hartmann mask, which is often used by conventional techniques for coarse figuring. Conventional techniques for coarse figuring often require two Pseudo-Hartmann masks, each of which is made up of sets of several multi-faceted prisms. Fabrication of the masks is difficult, time consuming and costly. Therefore, certain embodiments of the present invention can lower the cost and shorten the preparation time for aberration reduction. Some embodiments of the present invention usually can be implemented with minimum computation time.

It is understood the examples and embodiments described herein are for illustrative purposes only and that various modifications or changes in light thereof will be suggested to persons skilled in the art and are to be included within the spirit and purview of this application and scope of the appended claims.

What is claimed is:

1. A method for estimating and correcting an aberration of an optical system, the method comprising:
    capturing a first plurality of images on a first plurality of planes, the first plurality of images formed by at least the optical system;
    processing at least information associated with the first plurality of images;
    determining a first auxiliary function based upon at least the information associated with the first plurality of images, the first auxiliary function representing a first aberration of the optical system; and
    adjusting the optical system based upon at least information associated with the first auxiliary function.

2. The method of claim 1, wherein the capturing a first plurality of images comprises:
- capturing a first image of the first plurality of images on a first plane of the first plurality of planes; and
- capturing a second image of the first plurality of images on a second plane of the first plurality of planes.

3. The method of claim 2, wherein the first plane of the first plurality of planes is a focal plane of the optical system.

4. The method of claim 2, wherein the first plane of the first plurality of planes and the second plane of the first plurality of planes are located on opposite sides of a focal plane of the optical system.

5. The method of claim 2, wherein the first plane of the first plurality of planes and the second plane of the first plurality of planes are located on the same side of a focal plane of the optical system.

6. The method of claim 2, wherein the capturing a first plurality of images comprises:
- measuring a first plurality of intensities for each of the first plurality of images, the first plurality of intensities corresponding to a first plurality of locations on each of the first plurality of planes respectively.

7. The method of claim 6, wherein the processing at least information associated with the first plurality of images comprises:
- obtaining a first plurality of derivatives of intensity with respect to an optical axis of the optical system, the first plurality of derivatives corresponding to the first plurality of locations on a focal plane of the optical system.

8. The method of claim 7, wherein the processing at least information associated with the first plurality of images further comprises:
- obtaining a first intensity function, the first intensity function representing image intensity as a function of locations on a plane where an image is captured and as a function of distance between the plane and the focal plane of the optical system,
- whereupon the obtaining a first intensity function uses at least information associated with the first plurality of intensities.

9. The method of claim 8, wherein the obtaining a first intensity function uses a least square fit method.

10. The method of claim 7, wherein the determining the first auxiliary function comprises:
- obtaining a first plurality of values of the first auxiliary function at the first plurality of locations on the focal plane of the optical system,
- wherein the obtaining a first plurality of values uses at lease information associated with the first plurality of derivatives of intensity.

11. The method of claim 10, further comprising:
- capturing a second plurality of images on a second plurality of planes, the second plurality of images formed by at least the optical system;
- processing at least information associated with the second plurality of images; and
- determining a second auxiliary function based upon at least the information associated with the second plurality of images, the second auxiliary function representing a second aberration of the optical system.

12. The method of claim 11, wherein the capturing a second plurality of images comprises:
- capturing a first image of the second plurality of images on a first plane of the second plurality of planes; and
- capturing a second image of the second plurality of images on a second plane of the second plurality of planes.

13. The method of claim 12, wherein the first plane of the second plurality of planes is located farther from the focal plane than the first plane of the first plurality of planes from the focal plane.

14. The method of claim 13, wherein the second plane of the second plurality of planes is located farther from the focal plane than the second plane of the first plurality of planes from the focal plane.

15. The method of claim 11, further comprising:
- adjusting the optical system based upon at least information associated with the second auxiliary function.

16. The method of claim 1, further comprising:
- obtaining a plurality of influence function data with respect to a plurality of actuators, the plurality of actuators capable of reducing the first aberration of the optical system; and
- obtaining a influence function using at least information associated with the plurality of influence function data.

17. The method of claim 16, wherein adjusting the optical system based upon at least information associated with the first auxiliary function further comprises adjusting the plurality of actuators in response to the first auxiliary function and the influence function.

18. The method of claim 1, wherein the first plurality of images are formed with a collimated beam.

19. The method of claim 1, wherein the optical system is a telescope.

20. The method of claim 1, wherein the optical system is a mirror.

21. A method for estimating and correcting an aberration of an optical system, the method comprising:
- capturing a first plurality of images on a first plurality of planes, the first plurality of images formed by at least the optical system;
- processing at least information associated with the first plurality of images;
- determining a first auxiliary function based upon at least the information associated with the first plurality of images, the first auxiliary function representing a first aberration of the optical system; and
- adjusting the optical system based upon at least information associated with the first auxiliary function,
- whereupon the capturing, the processing, the determining, and the adjusting are free from dividing an aperture of the optical system into a plurality of sub-apertures, estimating an aberration for each sub-aperture, or reducing the aberration for each sub-aperture.

22. The method of claim 21, wherein the first aberration comprises a hill and a valley on the aperture of the optical system.

23. The method of claim 22, wherein the vertical distance between the top of the hill and the bottom of the valley is at least one wavelength of radiation from a light source, the light source associated with the optical system.

24. A method for estimating and correcting an aberration of an optical system, the method comprising:
- capturing a plurality of images on a plurality of planes, the plurality of images formed by at least the optical system;
- measuring a plurality of intensities for each of the plurality of images, the plurality of intensities corresponding to a plurality of locations on each of the plurality of planes respectively;
- obtaining a plurality of derivatives of intensity with respect to an optical axis of the optical system using at least information associated with the plurality of intensities, the plurality of derivatives corresponding to the plurality of locations on a focal plane of the optical system; and determining a first auxiliary function based upon at least information associated with the plurality of derivatives, the first auxiliary function representing an aberration of the optical system.

25. The method of claim 24, wherein the capturing a plurality of images comprises:
   capturing a first image of the plurality of images on a first plane of the plurality of planes; and
   capturing a second image of the plurality of images on a second plane of the plurality of planes.

26. The method of claim 25, wherein the obtaining a plurality of derivatives of intensity comprises:
   obtaining an intensity function, the intensity function representing image intensity as a function of locations on a plane where an image is captured and as a function of distance between the plane and the focal plane of the optical system,
   whereupon obtaining the intensity function uses at least the information associated with the plurality of intensities.

27. The method of claim 26, wherein the obtaining an intensity function uses a least square fit method.

28. A system for estimating and correcting an aberration of an optical system, the system comprising:
   a testing system;
   a control system connected to the testing system; and
   an adjustment system connected to the testing system and to the control system,
   wherein the testing system and the control system are configured to capture a plurality of images on a plurality of planes, the plurality of images formed by at least the optical system,
   wherein the control system is configured to:
      process at least information associated with the plurality of images; and
      determine an auxiliary function based upon at least the information associated with the plurality of images, the first auxiliary function representing a first aberration of the optical system,
   wherein the adjustment system and the control system are configured to adjust the optical system based upon at least information associated with the auxiliary function.

29. The system of claim 28, wherein the optical system is a mirror corresponding to a center of curvature.

30. The system of claim 29, wherein the testing system comprises:
   a light source generating a first beam, the light source being substantially a point light source;
   a first lens converting the first beam to a second collimated beam;
   a beam splitter partially reflecting the second collimated beam to form a third collimated beam;
   a second lens focusing the third collimated beam to a focal point of the second lens, the focal point coinciding with the center of curvature;
   the mirror reflecting the third collimated beam to form a fourth beam, the fourth beam collimated by the second lens; and
   an image detector capturing a plurality of images on a plurality of planes, the plurality of images formed by the fourth collimated beam.

31. The system of claim 29, wherein the adjustment system comprising actuators located on the backside of the mirror.

32. The system of claim 28, wherein the adjustment system comprising a polishing system.

33. The system of claim 28, wherein the control system comprises a computer-readable medium, the computer-readable medium comprising:
   one or more instructions for capturing the plurality of images on the plurality of planes;
   one or more instructions for processing at least information associated with the plurality of images;
   one or more instructions for determining an auxiliary function based upon at least the information associated with the plurality of images; and
   one or more instructions for adjusting the optical system based upon at least information associated with the auxiliary function.

* * * * *